United States Patent
Wang

(10) Patent No.: US 12,099,993 B2
(45) Date of Patent: Sep. 24, 2024

(54) RESOURCE TRANSFER METHOD AND APPARATUS, COMPUTER DEVICE, AND STORAGE MEDIUM

(71) Applicant: TENCENT TECHNOLOGY (SHENZHEN) COMPANY LTD, Guangdong (CN)

(72) Inventor: Guizhao Wang, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 962 days.

(21) Appl. No.: 16/997,166

(22) Filed: Aug. 19, 2020

(65) Prior Publication Data

US 2020/0380494 A1  Dec. 3, 2020

Related U.S. Application Data

(63) Continuation of application No. PCT/CN2019/082426, filed on Apr. 12, 2019.

(30) Foreign Application Priority Data

May 9, 2018 (CN) .......................... 201810436511.6

(51) Int. Cl.
*G06Q 20/32* (2012.01)
*G06Q 50/40* (2024.01)
(52) U.S. Cl.
CPC ..... *G06Q 20/3278* (2013.01); *G06Q 20/3274* (2013.01); *G06Q 50/40* (2024.01)
(58) Field of Classification Search
CPC . G06Q 20/3278; G06Q 20/3274; G06Q 50/30
See application file for complete search history.

(56) References Cited

U.S. PATENT DOCUMENTS 8,827,156 B2 * 9/2014 Hammad ............. G06Q 20/045
235/375
10,460,530 B2 * 10/2019 Feuillette ................ H04W 4/42
(Continued)

FOREIGN PATENT DOCUMENTS

CN 105023148 A 11/2015
CN 106548338 A 3/2017
(Continued)

OTHER PUBLICATIONS

EMV Contactless Specifications for Payment Systems Book B Entry Point Specification, Version 2.6, Jul. 2016 https://www.emvco.com/specifications/?tax%5Bspecifications_categories%5D%5B32%5D%5B%5D=35# (Year: 2016).*

(Continued)

*Primary Examiner* — John W Hayes
*Assistant Examiner* — Yingying Zhou
(74) *Attorney, Agent, or Firm* — Sughrue Mion, PLLC

(57) ABSTRACT

A resource transfer method performed by a terminal is provided. The method includes: receiving, through near field communication (NFC) by a terminal that is located within an identification range of a resource transfer interaction device, an application identifier (AID) selection request from the resource transfer interaction device; obtaining a target resource transfer AID based on the AID selection request; obtaining resource transfer data corresponding to the target resource transfer AID, and generating an AID selection response message based on the target resource transfer AID and the resource transfer data, the resource transfer data being located in a custom field of the AID selection response message; and transmitting the AID selection response message to the resource transfer interaction device, a resource transfer being performed based on the target resource transfer AID and the resource transfer data.

16 Claims, 10 Drawing Sheets

(56) References Cited

U.S. PATENT DOCUMENTS

| | | | | |
|---|---|---|---|---|
| 2014/0040120 A1* | 2/2014 | Cho | .................... | G06Q 20/3278 |
| | | | | 705/39 |
| 2015/0186864 A1* | 7/2015 | Jones | ................. | G06Q 20/3278 |
| | | | | 705/39 |
| 2016/0027017 A1* | 1/2016 | Chitragar | ........... | G06Q 20/3829 |
| | | | | 705/71 |
| 2016/0140535 A1* | 5/2016 | Noe | ................... | G06Q 20/3574 |
| | | | | 705/39 |
| 2017/0048655 A1* | 2/2017 | Kwon | ..................... | H04W 4/80 |
| 2017/0109178 A1* | 4/2017 | Chen | ....................... | G06Q 40/03 |
| 2020/0286061 A1* | 9/2020 | Wang | ................. | G06Q 20/4014 |

FOREIGN PATENT DOCUMENTS

| | | |
|---|---|---|
| CN | 107133792 A | 9/2017 |
| CN | 107316188 A | 11/2017 |
| CN | 206833457 U | 1/2018 |
| CN | 107944926 A | 4/2018 |
| JP | 2017-533528 A | 11/2017 |
| JP | 2018-022451 A | 2/2018 |

OTHER PUBLICATIONS

Finzgar et al., Use of NFC and QR code identification in an electronic ticket system for public transport, Sep. 15-17, 2011, IEEE, SoftCOM 2011, 19th International Conf on Software, Telecommunications and Compute Networks. (Year: 2011).*
Extended European Search Report issued Aug. 27, 2021 in European Application No. 19800056.4.
EMV, "Contactless Specifications for Payment Systems, Book B: Entry Point Specification", Version 2.6, Jul. 2016 (52 pages total).
Written Opinion of the International Searching Authority issued Jul. 24, 2019 in International Application No. PCT/CN2019/082426.
Communication dated Jun. 22, 2021, issued by the Japanese Patent Office in application No. 2020-542813.
International Search Report for PCT/CN2019/082426 dated Jul. 24, 2009 (PCT/ISA/210).

* cited by examiner

RESOURCE TRANSFER METHOD AND APPARATUS, COMPUTER DEVICE, AND STORAGE MEDIUM

CROSS-REFERENCE TO RELATED APPLICATION(S)

This application is a bypass continuation application of International Application No. PCT/CN2019/082426, filed on Apr. 12, 2019, which claims priority to Chinese Patent Application No. 201810436511.6, filed with the China National Intellectual Property Administration on May 9, 2018 and entitled "RESOURCE TRANSFER METHOD AND APPARATUS, COMPUTER DEVICE, AND STORAGE MEDIUM", the disclosures of which are herein incorporated by reference in their entireties.

FIELD

The disclosure relates to the field of computer processing technologies, and in particular, to a resource transfer method and apparatus, a computer device, and storage medium.

BACKGROUND

With the development of the Internet, an increasing number of users perform payment by using third-party payment software. In conventional payment software, payment is generally performed in a manner of scanning a two-dimensional barcode. Recently, a payment manner based on short distance wireless communication (for example, near field communication (NFC)) is provided.

SUMMARY

Embodiments of the disclosure provide an efficient resource transfer method and apparatus, a computer device, and a storage medium.

According to an aspect of an example embodiment, provided is a resource transfer method, performed by a terminal, the method including:
  receiving, through near field communication (NFC) by a terminal that is located within an identification range of a resource transfer interaction device, an application identifier (AID) selection request from the resource transfer interaction device;
  obtaining a target resource transfer AID based on the AID selection request;
  obtaining resource transfer data corresponding to the target resource transfer AID, and generating an AID selection response message based on the target resource transfer AID and the resource transfer data, the resource transfer data being located in a custom field of the AID selection response message; and
  transmitting the AID selection response message to the resource transfer interaction device, a resource transfer being performed based on the target resource transfer AID and the resource transfer data.

According to an aspect of an example embodiment, provided is a resource transfer apparatus, including:
  at least one memory configured to store program code; and
  at least one processor configured to read the program code and operate as instructed by the program code, the program code including:
    identifier request receiving code configured to cause at least one of the at least one processor to receive, through near field communication (NFC) in a terminal that is located within an identification range of a resource transfer interaction device, an application identifier (AID) selection request from the resource transfer interaction device;
    identifier obtaining code configured to cause at least one of the at least one processor to obtain a target resource transfer AID based on the AID selection request;
    message generation code configured to cause at least one of the at least one processor to obtain resource transfer data corresponding to the target resource transfer AID, and generate an AID selection response message based on the target resource transfer AID and the resource transfer data, the resource transfer data being located in a custom field of the AID selection response message; and
    transmission code configured to cause at least one of the at least one processor to transmit the AID selection response message to the resource transfer interaction device, a resource transfer being performed based on the target resource transfer AID and the resource transfer data.

A computer device, including at least one memory and at least one processor, the memory storing computer program, the computer program, when executed by the processor, causing at least one of the at least one processor to perform:
  receiving, through near field communication (NFC) by a terminal that is located within an identification range of a resource transfer interaction device, an application identifier (AID) selection request from the resource transfer interaction device;
  obtaining a target resource transfer AID based on the AID selection request;
  obtaining resource transfer data corresponding to the target resource transfer AID, and generating an AID selection response message based on the target resource transfer AID and the resource transfer data, the resource transfer data being located in a custom field of the AID selection response message; and
  transmitting the AID selection response message to the resource transfer interaction device, a resource transfer being performed based on the target resource transfer AID and the resource transfer data.

A non-transitory computer-readable storage medium, storing computer program, the computer program, when executed by at least one processor, causing at least one of the at least one processor to perform:
  receiving, through near field communication (NFC) by a terminal that is located within an identification range of a resource transfer interaction device, an application identifier (AID) selection request from the resource transfer interaction device;
  obtaining a target resource transfer AID based on the AID selection request;
  obtaining resource transfer data corresponding to the target resource transfer AID, and generating an AID selection response message based on the target resource transfer AID and the resource transfer data, the resource transfer data being located in a custom field of the AID selection response message; and
  transmitting the AID selection response message to the resource transfer interaction device, a resource transfer being performed based on the target resource transfer AID and the resource transfer data.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

To make the objectives, technical solutions, and advantages of the disclosure clearer and more comprehensible, the following further describes the disclosure in detail with reference to the accompanying drawings and the embodiments. It is to be understood that the specific embodiments described herein are only used for describing the disclosure, but are not intended to limit the disclosure.

It may be understood that the terms "first", "second" and the like used in the disclosure may be used for describing various elements in this specification. However, the elements are not limited by the terms unless otherwise specified. The terms are merely used to distinguish the first element from another element. Throughout the disclosure, the expression "at least one of a, b or c" indicates only a, only b, only c, both a and b, both a and c, both b and c, all of a, b, and c, or variations thereof.

Figure 1:
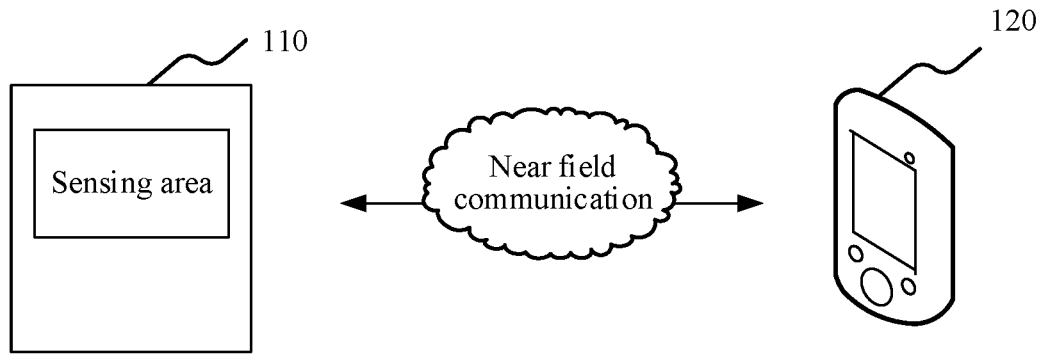
FIG. 1 is a diagram of an application environment of a resource transfer method in an embodiment.

FIG. 1 is a diagram of an application environment of a resource transfer method in an embodiment. Referring to FIG. 1, the resource transfer method is applied to a near field communication (NFC) system. The near field communications system includes a resource transfer interaction device 110 and a terminal 120. The resource transfer interaction device 110 and the terminal 120 communicate with each through short distance wireless communication (for example, NFC communication). The resource transfer interaction device 110 may be any device that supports NFC and that is configured to implement resource transfer, and for example, may be a collection device of a public transport vehicle, a collection device of a supermarket, or the like. The terminal 120 may be specifically a mobile terminal, and the mobile terminal may be specifically at least one of a mobile phone, a tablet computer, a notebook computer, or the like. When the terminal 120 is located within an identification range of the resource transfer interaction device 110, the resource transfer interaction device 110 transmits an application identifier (AID) selection request to the terminal 120 through NFC, and after receiving the AID selection request, the terminal 120 obtains a target resource transfer AID according to the AID selection request, obtains resource transfer data corresponding to the target resource transfer AID, generates an AID selection response message according to the target resource transfer AID and the resource transfer data, the resource transfer data being located in a custom field of the AID selection response message, and returns the AID selection response message to the resource transfer interaction device 110, the resource transfer interaction device 110 being configured to complete a corresponding resource transfer according to the target resource transfer AID and the resource transfer data.

Figure 2:
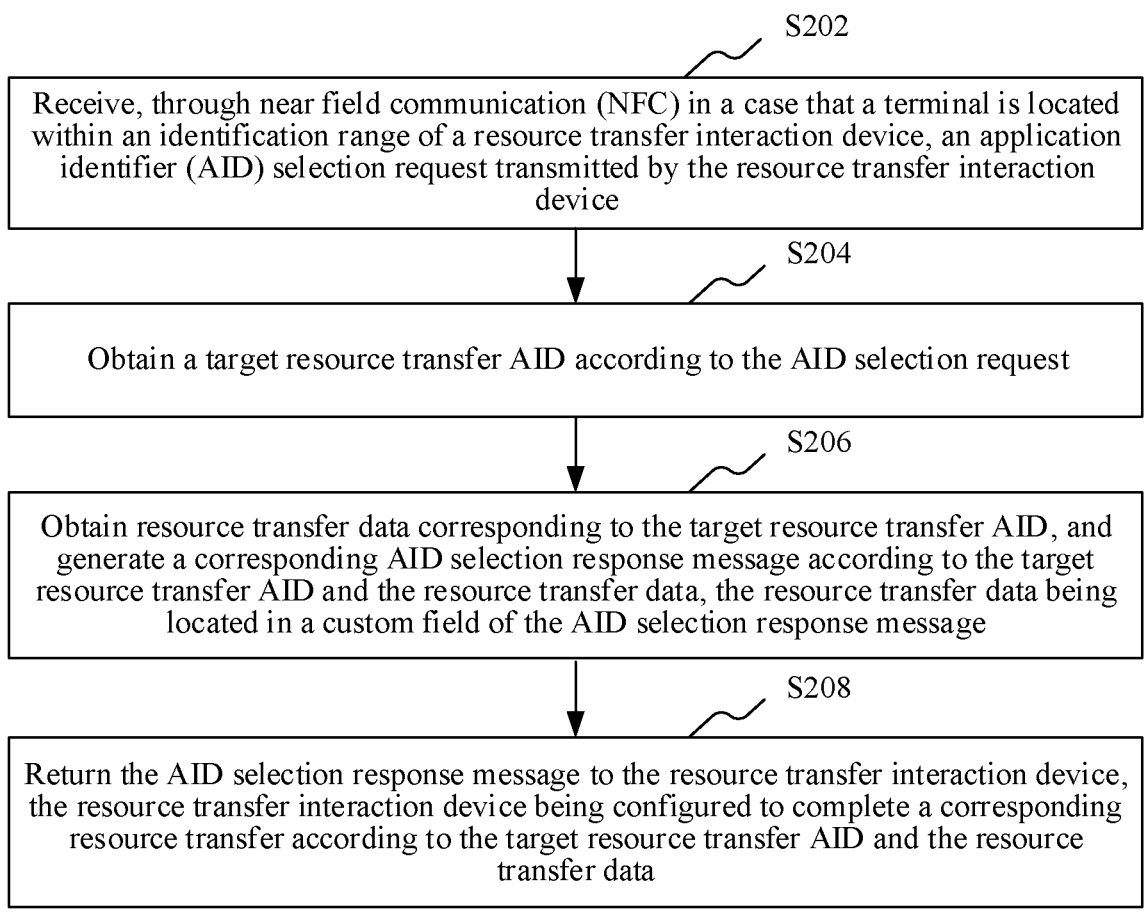
FIG. 2 is a flowchart of a resource transfer method in an embodiment.

As shown in FIG. 2, in an embodiment, a resource transfer method is provided, performed by a terminal. The resource transfer method specifically includes the following operations 202-208.

Operation S202. Receive an AID selection request transmitted by a resource transfer interaction device through NFC in a case that the terminal is located within an identification range of the resource transfer interaction device.

The resource transfer interaction device refers to a device that supports NFC and that is configured to implement resource transfer, and for example, may be a collection device of a public transport vehicle, a collection device of a supermarket, or the like. Short distance wireless communication is a short range high-frequency wireless communications technology, and allows non-contact point-to-point data transmission between electronic devices. The short distance wireless communication includes NFC, Bluetooth communication, and the like. The AID selection request refers to an instruction transmitted by the resource transfer interaction device to a terminal that is close to the resource transfer interaction device, and is used for obtaining an AID to be used subsequently. The AID is used for uniquely identifying an application and includes a registered application provider identifier (RID) and a proprietary AID extension (PIX). The identification range of resource transfer interaction device refers to a distance range that may be covered by the NFC of resource transfer interaction device.

Operation S204. Obtain a target resource transfer AID according to the AID selection request.

After receiving the AID selection request of the resource transfer interaction device, the terminal selects the target resource transfer AID to be used subsequently. The resource transfer AID may be classified into a debit card AID, a credit card AID, an electronic cash AID, a two-dimensional barcode AID, or the like. The function of selecting an AID is to indicate a specific application for subsequent resource transfer interaction. The target resource transfer AID herein is an identifier of an application that is selected by the terminal and that is used for resource transfer interaction subsequently. For example, assuming that the selected target resource transfer AID is a two-dimensional barcode AID, subsequent exchanged data may be a two-dimensional barcode data corresponding to the two-dimensional barcode AID.

Operation S206. Obtain resource transfer data corresponding to the target resource transfer AID, generate a corresponding AID selection response message according to the target resource transfer AID and the resource transfer data, the resource transfer data being located in a custom field of the AID selection response message.

The resource transfer data refers to the target data for resource transfer, including: a user account used for a deduction. The user account used for a deduction may be associated with or the same as a user account of the target resource transfer application. The AID selection response message refers to a message returned by the terminal according to the AID selection request. The function of the conventional AID selection response message is only to transmit the AID selected by the terminal. In an embodiment of the disclosure, the terminal not only transmits the selected target resource transfer AID, but also transmits the resource transfer data corresponding to the target resource transfer AID. Specifically, the terminal adds the resource transfer data to the custom field of the AID selection response message, and generates the AID selection response message including the resource transfer data. In this manner, when the terminal subsequently returns the AID selection response message, the terminal may transmit the resource transfer data to the resource transfer interaction device, to rapidly transmit the resource transfer data to the resource transfer interaction device. Accordingly, efficiency of the resource transfer may be improved.

Operation S208. Return the AID selection response message to the resource transfer interaction device, the resource transfer interaction device being configured to complete a corresponding resource transfer according to the target resource transfer AID and the resource transfer data.

The resource transfer interaction device is configured to complete the corresponding resource transfer from the user account according to the received resource transfer data. After generating the corresponding AID selection response message according to the target resource transfer AID and resource transfer data, the terminal returns the AID selection response message to the resource transfer interaction device. Compared with a manner in which the resource transfer interaction device starts to read a resource transfer data request only after receiving an AID response message, an embodiment of the disclosure directly adds the resource transfer data to the AID selection response message and returning the AID selection response message to the resource transfer interaction device, which achieves rapid transmission of the resource transfer data to the resource transfer interaction device, thereby improving efficiency of the resource transfer.

In the foregoing resource transfer method, when the terminal is located within the identification range of the resource transfer interaction device, the terminal receives, through NFC, the AID selection request transmitted by the resource transfer interaction device, then obtains the target resource transfer AID and the corresponding resource transfer data, and further, adds the resource transfer data to the custom field of the AID selection response message. In this manner, when the AID selection response message is returned, the resource transfer data may be transmitted to the resource transfer interaction device, thereby rapidly transmitting the resource transfer data to the resource transfer interaction device, and improving efficiency of resource transfer.

Figure 3:
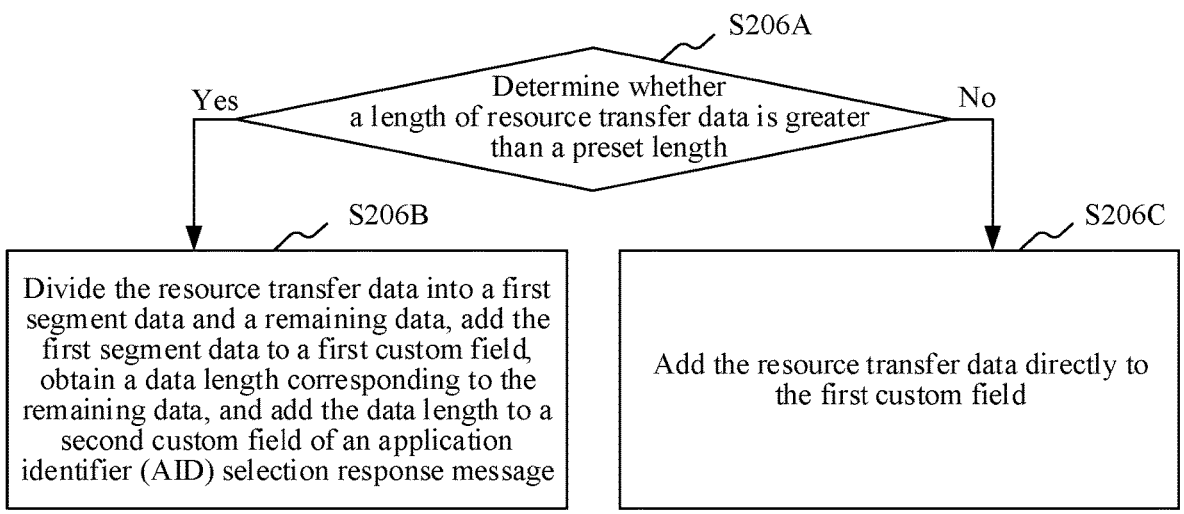
FIG. 3 is a flowchart of generating an application identifier (AID) selection response message in an embodiment.

As shown in FIG. 3, in an embodiment, the custom field includes a first custom field and a second custom field, and the generating a corresponding AID selection response message according to the target resource transfer AID and the resource transfer data includes the following operations S206A, S206B, and S206C.

Operation S206A. Determine whether a length of the resource transfer data is greater than a preset length; if yes, perform operation S206B; and if not, perform operation S206C.

The terminal determines whether the length of the resource transfer data is greater than the preset length (for example, 10 bytes), and if yes, the resource transfer data needs to be divided into first segment data and remaining data. The first segment data refers to data of the preset length in the front of the resource transfer data, and the remaining data refers to data other than the first segment data. For example, assuming that the preset length is 10 bytes and the resource transfer data has 18 bytes, the first 10 bytes of the resource transfer data are used as the first segment data, and the remaining 8 bytes are used as the remaining data. If the length of the resource transfer data is not greater than the preset length, the entire resource transfer data is added to the first custom field directly.

Operation S206B. Divide the resource transfer data into first segment data and remaining data, add the first segment data to the first custom field, obtain a data length corresponding to the remaining data, and add the data length to the second custom field of the AID selection response message.

When a length of the resource transfer data is greater than the preset length, the terminal divides the resource transfer data into two parts: first segment data and remaining data. A data length of the remaining data is obtained. The first segment data is added to the first custom field of the AID selection response message, and the data length of the remaining data is added to the second custom field of the AID selection response message.

Operation S206C. Add the resource transfer data directly to the first custom field.

When the resource transfer data is not greater than the preset length, the terminal directly adds the resource transfer data to the first custom field of the AID selection response message.

In an embodiment, the second custom field further includes: a file identifier used for storing the remaining data in the resource transfer interaction device. For example, the file identifier may be obtained from a resource transfer environment selection request when the terminal receives the resource transfer environment selection request transmitted by the resource transfer interaction device. More details will be provided later. The foregoing resource transfer method further includes: receiving, by the terminal, a remaining data reading request transmitted by the resource transfer interaction device, and transmitting the remaining data to the resource transfer interaction device, the resource transfer interaction device being configured to store the received remaining data into a file corresponding to the file identifier.

The second custom field includes not only the length of the remaining data, but also the file identifier used for storing the remaining data in the resource transfer interaction device. The file identifier is used for uniquely identifying a file. That is, the second custom field also includes a file identifier that specifies a specific file in the resource transfer interaction device to which the remaining data will be stored subsequently. After receiving the AID selection response message, the resource transfer interaction device reads the length of the remaining data in the second custom field, and if the length of the remaining data is not 0, transmits a remaining data reading request to the terminal. After receiving the remaining data reading request transmitted by the resource transfer interaction device, the terminal transmits the remaining data to the resource transfer interaction device, the resource transfer interaction device storing the received remaining data in the file corresponding to the foregoing file identifier.

In an embodiment, a structure of AID selection response message is shown in Table 1.

TABLE 1

| Label | | Value | Existence |
|---|---|---|---|
| '6F' | | FCI template | M |
| | '84' | DF name | M |
| | 'A5' | FCI data-specific template | M |
| | '50' | Application label | M |
| | '87' | Application priority indicator | O |
| | '9F38' | PDOL | O |
| | '5F2D' | Preferred language | O |
| | '9F11' | Card issuer code table index | O |
| | '9F12' | Application priority name | O |
| | 'BF0C' | Card Issuer custom data (FCI) | O |
| | | 9F46  First custom field | O |
| | | 9F47  Second custom field | O |

The 9F46 and 9F47 labels in the foregoing AID selection response message represent the first custom field and the second custom field, respectively. M represents mandatory, and O represents optional. The DF name is a dedicated file name. The PDOL refers to a processing options data object list. If the length of the resource transfer data to be transmitted is not greater than the preset length, the terminal may complete transmission by using the AID selection response message. If the length of the transmitted resource transfer data is greater than the preset length, the terminal needs to add the length of the remaining data and a binary file name used for storing the remaining data to the 9F47 label. After receiving the AID selection response message sent back by the terminal, when determining, by reading the length of the remaining data in the 9F47 label, that the length of the remaining data is greater than 0, the resource transfer interaction device initiates an instruction of a remaining data reading request, and then, after receiving remaining data transmitted by the terminal according to the remaining data reading request, the resource transfer interaction device stores the read remaining data into the file corresponding to the binary file name. In an embodiment, a format of a command message of the remaining data reading request of the resource transfer interaction device is shown in Table 2.

TABLE 2

| Code | Value |
|---|---|
| CLA | 00 |
| INS | B0 |
| P1 | XX |
| | XX |
| P2 | 00 |
| Lc | Non-existent |
| Data | Non-existent |
| Le | XX |

CLA represents an instruction type; INS represents an instruction code of an instruction type; P1 and P2 represent command parameters; Lc represents a data length of a data field, where the length cannot exceed 239 bytes; Data represents a data field or an acknowledgment data field; and Le represents a length of data to be returned. The XX in Table 2 represents a variable value. In an embodiment, an example in which a command message of a remaining data reading request is 00B0100101010F08 is used. 00 represents the CLA, B0 represents the INS, upper three bits of P1 are 100, lower five bits P1 are a file identifier, representing a file, 10101, 0F represents reading subsequent data from the beginning of the file, 10101, at an offset of 16 bytes, and 08 represents reading 8 bytes backward from the beginning of the byte 0F. Therefore, the command message of the remaining data reading request is interpreted as: 'starting from the byte 0F of file, 10101, taking 8 bytes backward, and returning'.

The response message that corresponds to the remaining data reading request and that is returned by the terminal is, for example, transmission data content+9F47+04+binary file name+remaining length. The transmission data content is remaining data, and 04 refers to a corresponding instruction type. The binary file name refers to a file name used for storing the remaining data. Due to a limited data length of each transmission, if the length of the remaining data is greater than a maximum transmission length, the terminal needs to further divide the remaining data into two parts. Similarly, the terminal will transmit the "remaining length" of the remaining data after this transmission, so that the resource transfer interaction device may continue to read the remaining data next time and does not stop reading until the remaining length is 0.

In an embodiment, the foregoing resource transfer method further includes: receiving resource transfer record data returned by the resource transfer interaction device, the resource transfer record data including at least one of resource transfer location information, a resource transfer value, a device identifier corresponding to the resource transfer interaction device, and resource transfer time information; and storing the resource transfer record data.

To enable the terminal to also retain the resource transfer record data, the resource transfer interaction device is enabled to return the resource transfer record data to the terminal after receiving the resource transfer data. The terminal receives the resource transfer record data written back by the resource transfer interaction device and stores the resource transfer record data. For storage security, in an embodiment, after receiving the resource transfer record data, the terminal stores the resource transfer record data in an encrypted manner. Because the resource transfer record data is written back through NFC, the resource transfer record data may alternatively be written back without using a network. In an embodiment, the resource transfer record data received by the terminal is stored in a directory corresponding to a child application program in the terminal through interaction between the child application program and the resource transfer interaction device. Compared with the conventional writing-back manner relying on a physical card, an embodiment of the disclosure implements writing data back to the child application program in the terminal, that is, implements writing data back to a virtual card.

In an embodiment, when the terminal is connected to a network, the terminal may upload the resource transfer record data to a server corresponding to the child application program, and the server may subsequently analyze user behaviors according to the collected resource transfer record data. For example, a quantity of times of resource transfer record data of a user in one day is counted, and if the quantity of times exceeds a preset quantity of times, the server may analyze a malicious resource transfer.

In an embodiment in a travel application environment, the foregoing resource transfer interaction device is a collection device of a public transport vehicle. To shorten an interaction time between a terminal and the collection device of the public transport vehicle, a data structure may be designed to meet a minimum data quantity of recording travel environment information, and data is written back by using the data structure. In an embodiment, the designed data structure is shown in Table 3.

TABLE 3

| Field name | Type | Interpretation |
| --- | --- | --- |
| scan_time | unsigned int | Time |
| pay_fee | unsigned int | Actual deduction amount (discount deducted), unit: cent |
| scene | unsigned char | Scenario: 1 bus, 2 subway |
| scan_type | unsigned char | Type:<br>1 entry<br>2 exit<br>#One-time billing<br>scan_type = 1<br>#For two-segment billing, scan_type 1 and scan_type 2 need to be respectively transmitted according to entry and exit records |
| scan_location | int | Digitalized boarding location, one digit represents one location, and a specific digital location name is maintained by a backend |
| pos_id_len | unsigned char | Collection device ID length, a maximum of 64 bytes |
| pos_id | char* | Collection device ID |

The data structure formed above may be a minimum structure transmitted by the collection device of the public transport vehicle to the terminal and may be used for recording travel information. The foregoing resource transfer method is applicable to any scenario in which a resource transfer is performed.

In an embodiment, the resource transfer interaction device is a collection device of a public transport vehicle, and the target resource transfer AID is a two-dimensional barcode AID; the resource transfer record data includes at least one of travel starting location information, a travel starting collection device identifier, and a travel starting time in a case that the collection device of the public transport vehicle is a travel starting collection device; and the resource transfer record data includes, for example, at least one of travel ending location information, a travel ending collection device identifier, a travel ending time, and a travel fare in a case that the collection device of the public transport vehicle is a travel ending collection device.

Figure 4:
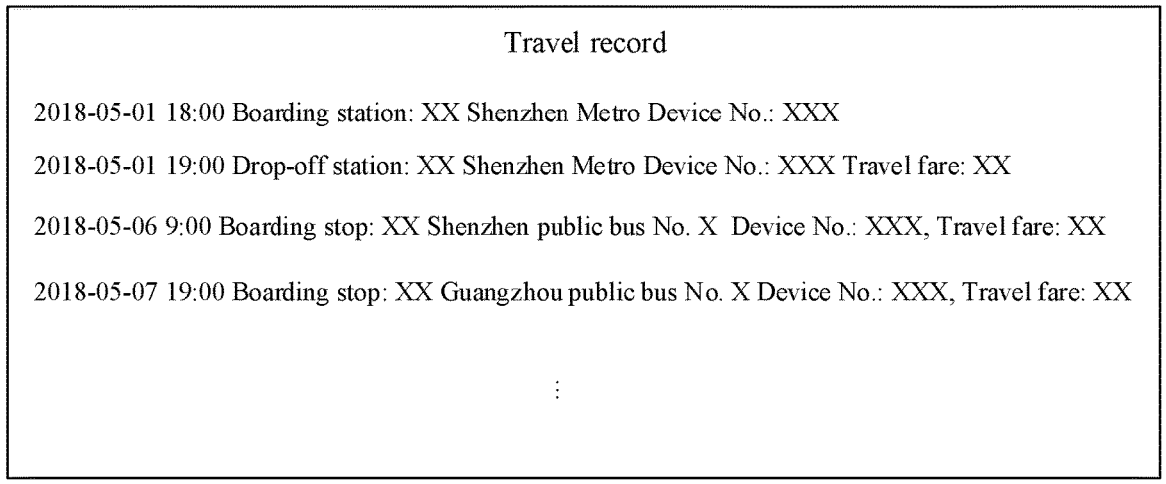
FIG. 4 is a schematic diagram of an interface of a travel record in an embodiment.

In an environment of a travel application, the resource transfer interaction device is a collection device of a public transport vehicle, the target resource transfer AID is a two-dimensional barcode AID, and the corresponding resource transfer data is a two-dimensional barcode resource transfer data. In a case that entry and exit information is needed to determine a specific deduction amount, similar to the subway, the collection device of the public transport vehicle needs to be classified into a travel starting collection device and a travel ending collection device. The resource transfer record data includes at least one of travel starting location information, a travel starting collection device identifier, and a travel starting time in a case that the collection device of the public transport vehicle is a travel starting collection device; and the resource transfer record data includes at least one of travel ending location information, a travel ending collection device identifier, a travel ending time, and a travel fare in a case that the collection device of the public transport vehicle is a travel ending collection device. The resource transfer record data is written back to the terminal, so that the user may check each travel record. In an embodiment, if a charging amount may be determined during boarding, similar to a public bus, corresponding resource transfer record data includes travel starting location information, a travel starting collection device identifier, a travel starting time, and a travel fare. This is applicable to travel in various places (e.g., cities). FIG. 4 is a schematic diagram of an interface of a travel record displayed by a terminal in an embodiment.

In an application scenario of a goods transaction, the foregoing resource transfer interaction device is a collection device of a business. Corresponding resource transfer record data includes: a purchase time, a purchase location, item information, an item amount, and the like.

In an embodiment, an AID selection request transmitted by the resource transfer interaction device is received through a child application program, and an operation after the receiving an AID selection request transmitted by the resource transfer interaction device is completed by the child application program, the child application program being run in a payment environment provided by a parent application program.

The terminal specifically interacts with the resource transfer interaction device through with a child application program on the terminal, the child application program being run in an environment provided by a parent application program on the terminal. The parent application program is an application program carrying the child application program and provides an environment for implementation of the child application program. The parent application program is a native application program. The native application program is an application program that may be directly run on an operating system. The parent application program may be a social (or social networking) application program, a dedicated application program specifically supporting a child application program, a file management application program, an email application program, a game application program, or the like.

An AID selection request transmitted by the resource transfer interaction device is received through a child application program; the child application program obtains a target resource transfer AID according to the AID selection request; the child application program obtains resource transfer data corresponding to the target resource transfer AID, and then generates a corresponding AID selection response message according to the target resource transfer AID and the resource transfer data, the resource transfer data being located in a custom field of the AID selection response message; and the child application program returns the AID selection response message to the resource transfer interaction device, the resource transfer interaction device being configured to complete a corresponding resource transfer according to the target resource transfer AID and the resource transfer data.

In an embodiment, before the receiving, through NFC, an AID selection request transmitted by the resource transfer interaction device, the method further includes: detecting whether the terminal supports NFC, if yes, performing, in a case that the terminal is located within the identification range of the resource transfer interaction device, the operation of receiving, through NFC, an AID selection request transmitted by the resource transfer interaction device; otherwise, generating, by the terminal, a two-dimensional barcode, the two-dimensional barcode carrying two-dimensional barcode resource transfer data.

Considering that some terminals may not support NFC, the resource transfer interaction device may obtain the resource transfer data by scanning a two-dimensional barcode in the terminal. A conventional selection method requires a user to manually select a specific resource transfer manner to use. In an embodiment of the disclosure, performing automatic selection by detecting whether the terminal supports NFC is provided. If NFC is supported, an NFC interaction manner is used. An AID selection request is received through NFC in a case that the terminal is located within the identification range of resource transfer interaction device. If NFC is not supported, the terminal generates a two-dimensional barcode by using a two-dimensional barcode interaction manner. The two-dimensional barcode carries two-dimensional barcode resource transfer data, and the resource transfer interaction device may obtain the corresponding two-dimensional barcode resource transfer data by scanning the two-dimensional barcode.

In an embodiment, NFC is implemented by calling a host-based card emulation (HCE) service. The HCE is emulating a card through an application in a terminal, and using the emulated card to interact with an external resource transfer interaction device. In a case that a secure element (SE) is implemented without hardware, a data exchange may still be carried out safely. In an embodiment, the NFC is implemented by the child application program in the terminal calling an API (Interface) of the HCE service. The child application program refers to a program that relies on the parent application program to provide the running environment, and the parent application program is an application program carrying the child application program and provides an environment for implementation of the child application program. The parent application program is a native application program. The native application program is an application program that may be directly run on an operating system. The parent application program may be a social application program, a dedicated application program specifically supporting a child application program, a file management application program, an email application program, a game application program, or the like.

In another embodiment, NFC may alternatively be implemented in the following manner: using a single wire protocol subscriber identity module (SWP SIM) card (a SIM card of a new specification) as a secure storage device of data, storing a card number and a password in the SWP SIM card, and connecting to an NFC controller through a C6 pin on the card. In this manner, a virtual card does not need to be emulated by using HCE, and key information, such as a card number and a password, are directly stored in the SWP SIM card.

Figure 5:
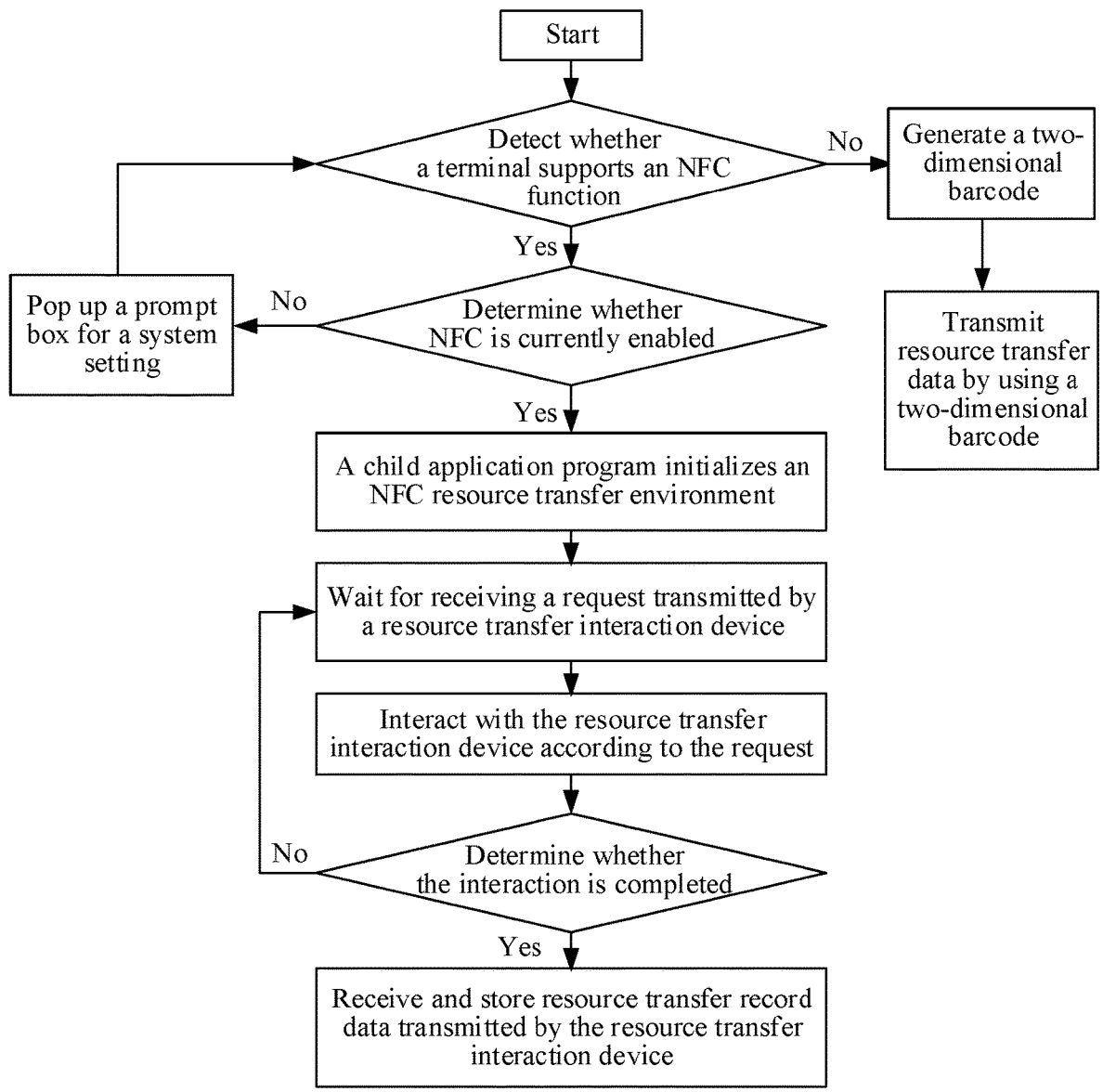
FIG. 5 is a schematic flowchart of a resource transfer method in an embodiment.

FIG. 5 is a schematic flowchart of a resource transfer in an embodiment. First, when a terminal starts to run a child application program, the child application program detects whether the terminal supports an NFC function, and if the terminal does not support the NFC function, the child application program directly generates a two-dimensional barcode and uses the two-dimensional barcode to transmit resource transfer data. If the NFC function is supported, the child application program determines whether NFC is currently enabled, and if the NFC function is not enabled, pops up a prompt box to prompt a user to perform a system setting and enable the NFC function. When determining that the NFC function is enabled, the child application program initializes an NFC resource transfer environment, then waits for receiving a request transmitted by an external resource transfer interaction device, interacts with the resource transfer interaction device according to the request, determines whether the interaction is completed, and if yes, indicating that transmission of resource transfer data is completed, then receives the resource transfer record data transmitted by the resource transfer interaction device, and stores the received data in an encrypted manner to a directory corresponding to the child application program.

In an embodiment, before the receiving, through NFC, an AID selection request transmitted by the resource transfer interaction device, the method further includes: receiving, through NFC, a resource transfer environment selection request transmitted by the resource transfer interaction device; and determining a target resource transfer environment according to the resource transfer environment selection request. In an embodiment, the obtaining a target resource transfer AID according to the AID selection request includes: selecting the target resource transfer AID obtained from a target resource transfer environment directory corresponding to the target resource transfer environment.

When interaction is performed through NFC, a resource transfer environment is selected first. The terminal receives, through NFC, the resource transfer environment selection request transmitted by the resource transfer interaction device, the resource transfer environment selection request being used for obtaining a target resource transfer environment selected by the terminal. Subsequently, the terminal selects the target resource transfer AID in a target resource transfer environment directory corresponding to the target resource transfer environment.

In an embodiment, when a resource transfer environment is selected, a selection instruction used in an instruction of the resource transfer environment selection request is a SELECT instruction for selecting a file. The SELECT instruction is to select a corresponding file on the terminal through a file name or a file identifier or by selecting an application to set a resource transfer environment, for example, select a master file (MF), a directory definition file (DDF) including a subdirectory, or an application definition file (ADF) including no subdirectory. A DDF is a directory entry in which there may be an ADF or a DDF. In an ADF, an ADF name is used to identify an application, the ADF name is also referred to as an AID, and an AID represents an application.

In an embodiment, a command message of a resource transfer environment selection request is shown in Table 4:

TABLE 4

| Code | Value |
| --- | --- |
| CLA | 00 |
| INS | A4 |
| P1 | 00: Perform selection according to a file identifier, and select an elementary file or a subdirectory file in a current directory<br>04: Perform selection according to a file identifier, and select a directory at the same level as a current directory or a subdirectory of the current directory |
| P2 | 00 |
| Lc | XX |
| Data | Empty or a file identifier or a DF name |
| Le | 00 |

CLA represents an instruction type; INS represents an instruction code of an instruction type; P1 and P2 represent command parameters; Lc represents a data length of a data field, where the length cannot exceed 239 bytes; Data represents a data field or an acknowledgment data field; and Le represents a length of data to be returned, where when Le is 00, indicating that data of a maximum length is returned, the length cannot exceed 239 bytes.

When the terminal receives the resource transfer environment selection request transmitted by the resource transfer interaction device, it is determined that 00A4 represents a SELECT instruction, and a specific directory or file name that needs to be selected is determined; and then P1 is determined, and if P1 is 00, it represents a file that needs to be selected for the request. A specifically selected file name is determined by Data. After a meaning of the request is specified, the terminal determines whether a file specified in the file name exists in the terminal. If the file exists, a response message representing existence of the file is transmitted to the resource transfer interaction device. If the file does not exist, a response message representing nonexistence of the file is transmitted to the resource transfer interaction device. Similarly, if P1 is 04, it represents that a directory described in Data is to be selected. After a meaning of the request is specified, the terminal determines whether a directory specified in Data exists in the terminal, if the directory exists, the terminal transmits a response message representing existence of the directory to the resource transfer interaction device, and if the directory does not exist, the terminal transmits a response message representing nonexistence of the directory to the resource transfer interaction device.

The response message corresponding to the resource transfer environment selection request transmitted by the terminal to the resource transfer interaction device includes loopback file control information (FCI), as shown in Table 5:

issuer custom data exists on the terminal. If no FCI card issuer custom data exists, the response message is 6F0AA506BF0C00. If FCI card issuer custom data exists, it represents that a directory or a file to be selected exists on the terminal. There may be a plurality of groups of 61 labels following BF0C, each group describes detailed information in the directory. Using 6F1EA51ABF0C14610411014F0810010101 as an example, there is data of a length of IE bytes (30 bytes in decimal) following the 6F label, A5 represents that FCI-specific template data of a length of 1A bytes (26 bytes in decimal) subsequently exists, and BF0C represents that FCI card issuer custom data of a length of 14 bytes (20 bytes in decimal) subsequently exists. Then the directory entry is described by the 61 label, a length of a directory name is 4 bytes, and the directory name is 1101. In the 1101 directory, a file exists. Therefore, the file is represented by the 4F label, a length of a file name is 8 bytes, and the file name is 10010101.

When an AID is selected, a structure of a command message of an AID selection request transmitted by the resource transfer interaction device is consistent with the structure in Table 4. A resource transfer environment selection request is used for selecting a target resource transfer environment directory, and the AID selection request is used for selecting a specific AID in the target resource transfer environment directory. Therefore, an AID file may be regarded as a file in the resource transfer environment directory and has a tree structure.

Figure 6:
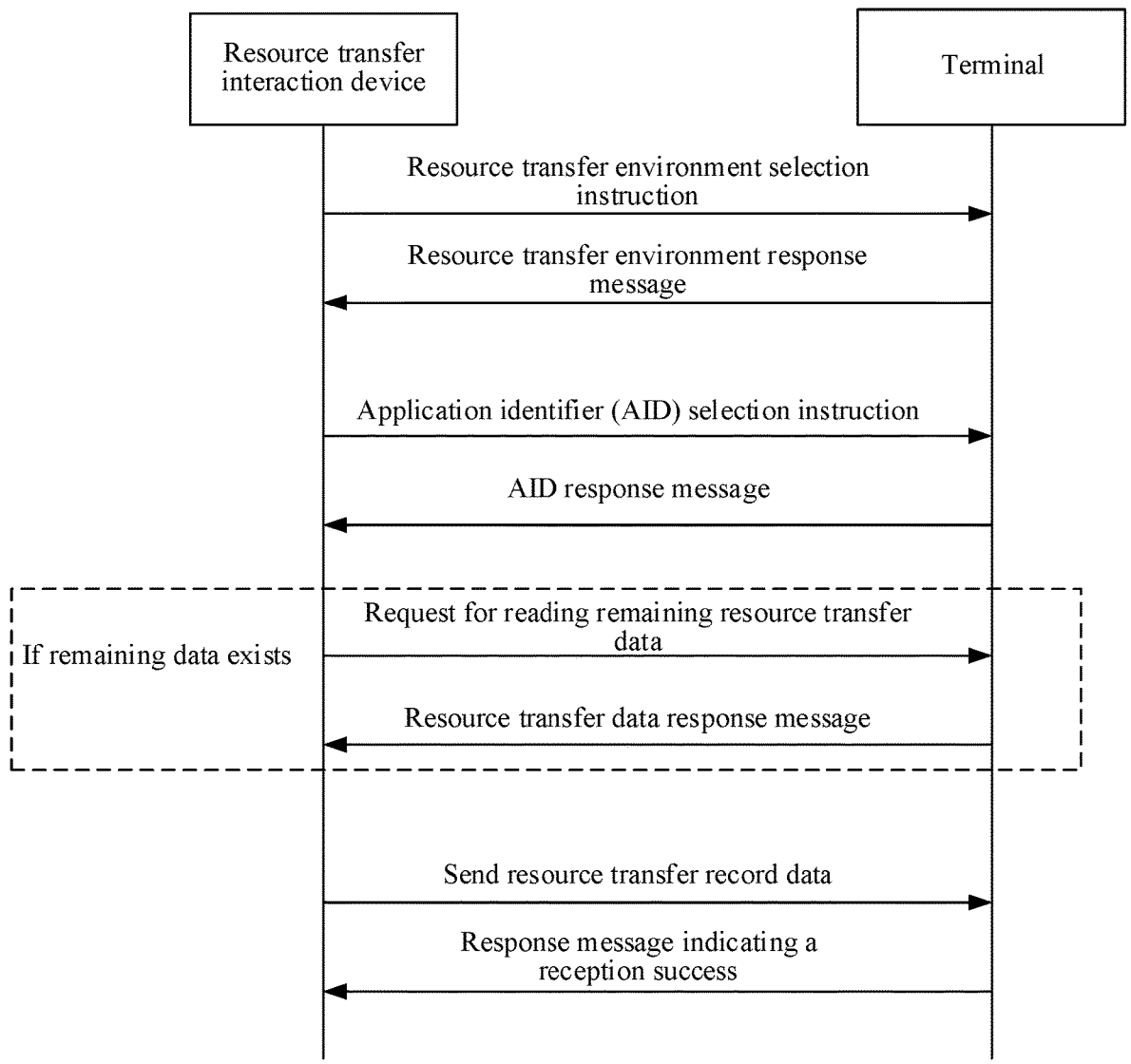
FIG. 6 is a diagram of interaction between a resource transfer interaction device and
a terminal in an embodiment.

FIG. 6 is a diagram of a resource transfer interaction device performing interaction with a terminal in an embodi-

TABLE 5

| Label | Value | | | | | Length | Occurrence condition |
|---|---|---|---|---|---|---|---|
| "6F" | FCI template | | | | | Lengthen | M |
| | "84" | "2PAY.SYS.DDF01" | | | | 0E | M |
| | "A5" | FCI-specific template | | | | Lengthen | M |
| | | "BF0C" | FCI card issuer custom data | | | Lengthen | M |
| | | | "61" | Directory entry | | Lengthen | M |
| | | | | "4F" | DF name (AID) | 07-08 | M |
| | | | | "50" | Application label | 04-10 | O |
| | | | | "87" | Application priority indicator | 01 | C* |
| | | | "61" | Directory entry | | Lengthen | C* |
| | | | | "4F" | DF name (AID) | 07-08 | C |
| | | | | "50" | Application label | 04-10 | C |
| | | | | "87" | Application priority indicator | 01 | C |
| | | | "61" | Directory entry | | Lengthen | C* |
| | | | | "4F" | DF name (AID) | 07-08 | C |
| | | | | "50" | Application label | 04-10 | C |

It can be learned from the table in combination with the foregoing tables that in a resource transfer interaction process, the response message always starts with 6F and is followed by 84 or A5. A value of 84 represents fixed 2PAY.SYS.DDF01, and in this case, the message returned by the terminal is, for example, 6F840E2PAY.SYS.DDF01. In a case of A5, the terminal determines whether an FCI-specific template exists on the terminal. If no FCI-specific template exists, a response message is 6F04A500. If an FCI-specific template exists, A5 needs to be followed by BF0C, and then the terminal determines whether FCI card ment. First, the resource transfer interaction device transmits a resource transfer environment selection instruction (request) to a terminal, and the terminal returns a resource transfer environment response message, the resource transfer environment response message including a selected resource transfer environment. Then the resource transfer interaction device transmits an AID selection instruction to the terminal, and the terminal returns a response message of an AID, the response message including the selected target resource transfer AID and resource transfer data. If there is remaining resource transfer data, the resource transfer interaction device transmits a request for reading the remaining resource transfer data to the terminal, and the terminal returns a response message of the resource transfer data, the response message including the remaining resource transfer data. Finally, the resource transfer interaction device transmits resource transfer record data to the terminal, the terminal stores the resource transfer record data after receiving the resource transfer record data, and returns to a response message indicating a reception success. In an embodiment, a command message of a selection instruction and a response message returned are transmitted in a tag, length, value (TLV) format. Tag is used for identifying different instructions, Length represents a length of Value following the instruction, and Value represents a specific value.

Figure 7:
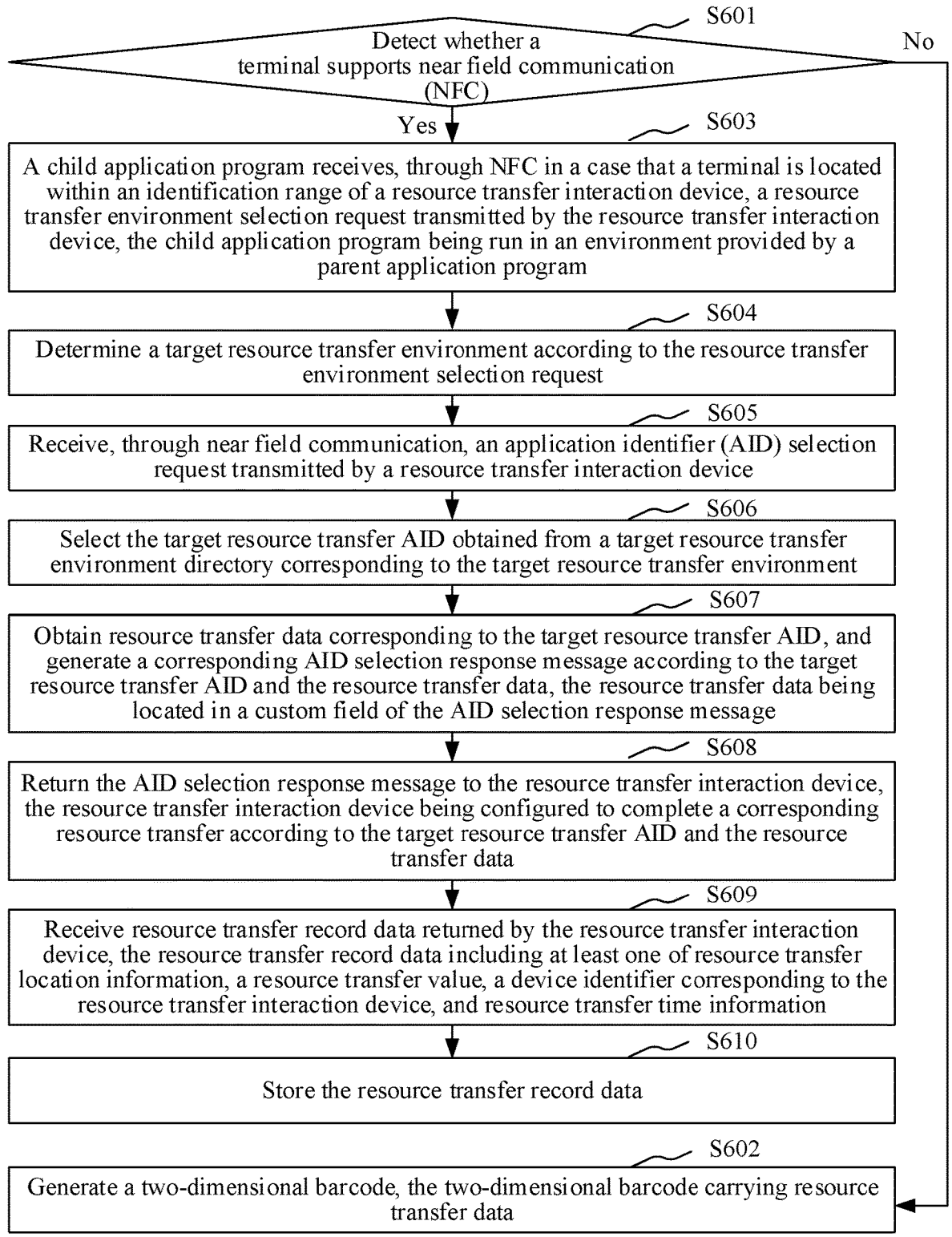
FIG. 7 is a flowchart of a resource transfer method in another embodiment.

As shown in FIG. 7, in an embodiment, a resource transfer method is provided, specifically including the following operations:

Operation S601. Detect whether a terminal supports NFC, and if yes, perform operation S603, and if not, perform operation S602.

Operation S602. Generate a two-dimensional barcode, the two-dimensional barcode carrying resource transfer data.

Operation S603. A child application program receives, through NFC in a case that the terminal is located within an identification range of a resource transfer interaction device, a resource transfer environment selection request transmitted by the resource transfer interaction device, the child application program being run in an environment provided by a parent application program.

Operation S604. Determine a target resource transfer environment according to the resource transfer environment selection request.

Operation S605. Receive, through NFC, an AID selection request transmitted by a resource transfer interaction device.

Operation S606. Select the target resource transfer AID obtained from a target resource transfer environment directory corresponding to the target resource transfer environment.

Operation S607. Obtain resource transfer data corresponding to the target resource transfer AID, and generate a corresponding AID selection response message according to the target resource transfer AID and the resource transfer data, the resource transfer data being located in a custom field of the AID selection response message.

Operation S608. Return the AID selection response message to the resource transfer interaction device, the resource transfer interaction device being configured to complete a corresponding resource transfer according to the target resource transfer AID and the resource transfer data.

Operation S609. Receive resource transfer record data returned by the resource transfer interaction device, the resource transfer record data including at least one of resource transfer location information, a resource transfer value, a device identifier corresponding to the resource transfer interaction device, and resource transfer time information.

Operation S610. Store the resource transfer record data.

The foregoing operations S601 to S610 may be performed by a child application program.

Figure 8:
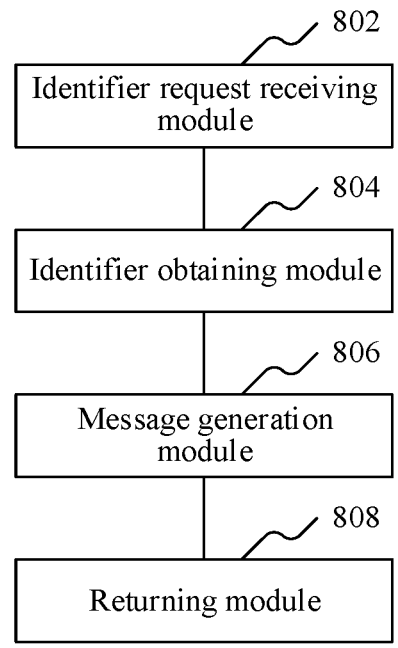
FIG. 8 is a structural block diagram of a resource transfer apparatus in an embodiment.

As shown in FIG. 8, in an embodiment, a resource transfer apparatus is provided, including:
an identifier request receiving module 802, configured to receive, through NFC in a case that a terminal is located within an identification range of a resource transfer interaction device, an AID selection request transmitted by the resource transfer interaction device;
an identifier obtaining module 804, configured to obtain a target resource transfer AID according to the AID selection request;
a message generation module 806, configured to obtain resource transfer data corresponding to the target resource transfer AID, and generate a corresponding AID selection response message according to the target resource transfer AID and the resource transfer data, the resource transfer data being located in a custom field of the AID selection response message; and
a returning module 808, configured to return the AID selection response message to the resource transfer interaction device, the resource transfer interaction device being configured to complete a corresponding resource transfer according to the target resource transfer AID and the resource transfer data.

In an embodiment, the custom field includes a first custom field and a second custom field, and the message generation module 806 is further configured to: divide the resource transfer data into first segment data and remaining data in a case that a length of the resource transfer data is greater than a preset length; add the first segment data to the first custom field; and obtain a data length corresponding to the remaining data, and add the data length to the second custom field of the AID selection response message.

Figure 9:
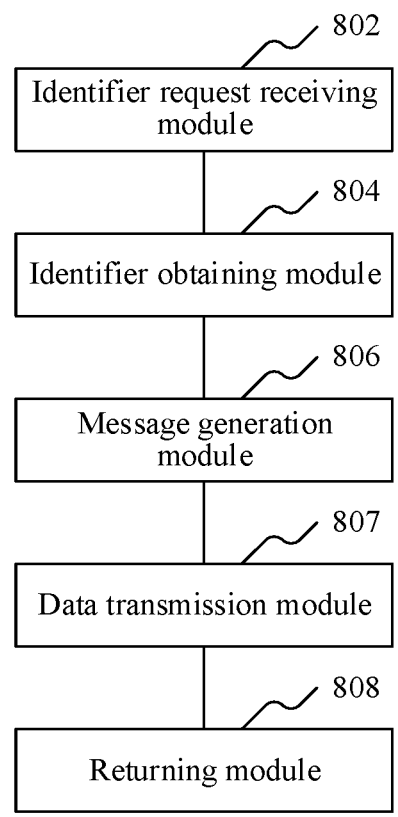
FIG. 9 is a structural block diagram of a resource transfer apparatus in another embodiment.

As shown in FIG. 9, in an embodiment, the second custom field further includes: a file identifier used for storing the remaining data in the resource transfer interaction device; and the foregoing resource transfer apparatus further includes:
a data transmission module 807, configured to receive a remaining data reading request transmitted by the resource transfer interaction device, and transmit the remaining data to the resource transfer interaction device according to the remaining data reading request, the resource transfer interaction device being configured to store the received remaining data into a file corresponding to the file identifier.

Figure 10:
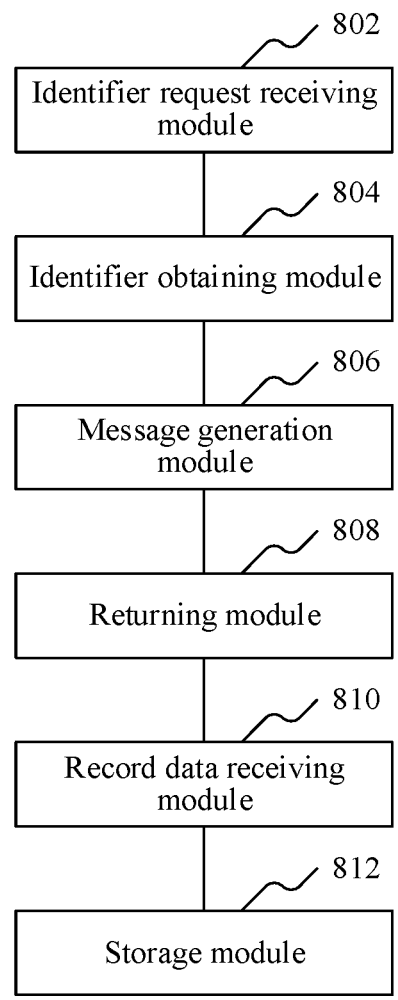
FIG. 10 is a structural block diagram of a resource transfer apparatus in still another embodiment.

As shown in FIG. 10, in an embodiment, the foregoing resource transfer apparatus further includes:
a record data receiving module 810, configured to receive resource transfer record data returned by the resource transfer interaction device, the resource transfer record data including at least one of resource transfer location information, a resource transfer value, a device identifier corresponding to the resource transfer interaction device, and resource transfer time information; and
a storage module 812, configured to store the resource transfer record data.

In an embodiment, the resource transfer interaction device is a collection device (e.g., travel record collection device) of a public transport vehicle, and the target resource transfer AID is a two-dimensional barcode AID; the resource transfer record data includes travel starting location information, a travel starting collection device identifier, and a travel starting time in a case that the collection device of the public transport vehicle is a travel starting collection device; and the resource transfer record data includes travel ending location information, a travel ending collection device identifier, a travel ending time, and a travel fare in a case that the collection device of the public transport vehicle is a travel ending collection device.

In an embodiment, an execution body of the apparatus is a child application program in the terminal. The AID selection request transmitted by the resource transfer interaction device is received through a child application program, and an operation after the receiving an AID selection request transmitted by the resource transfer interaction device is completed by the child application program, the child application program being run in a payment environment provided by a parent application program.

Figure 11:
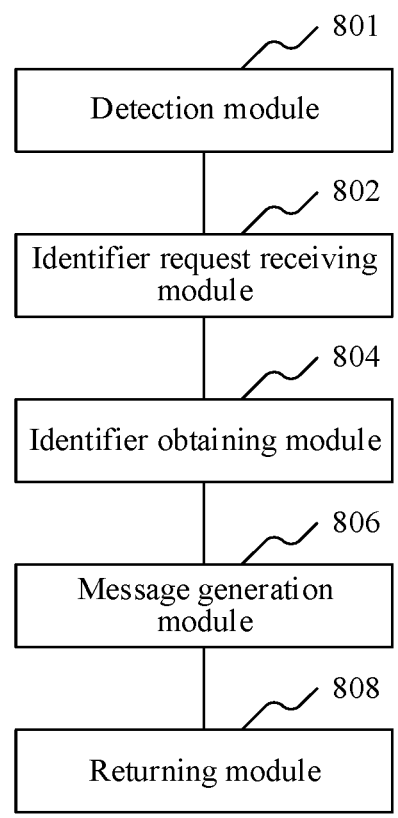
FIG. 11 is a structural block diagram of a resource transfer apparatus in yet another embodiment.

As shown in FIG. 11, in an embodiment, before the receiving, through NFC, an AID selection request transmitted by the resource transfer interaction device, the apparatus further includes:

a detection module 801, configured to detect whether the terminal supports NFC, and in response to a result being positive (that is, the terminal supports NFC), perform, in a case that the terminal is located within the identification range of the resource transfer interaction device, the operation of receiving, through NFC, an AID selection request transmitted by the resource transfer interaction device. Otherwise, the terminal generates a two-dimensional barcode, the two-dimensional barcode carrying two-dimensional barcode resource transfer data.

Figure 12:
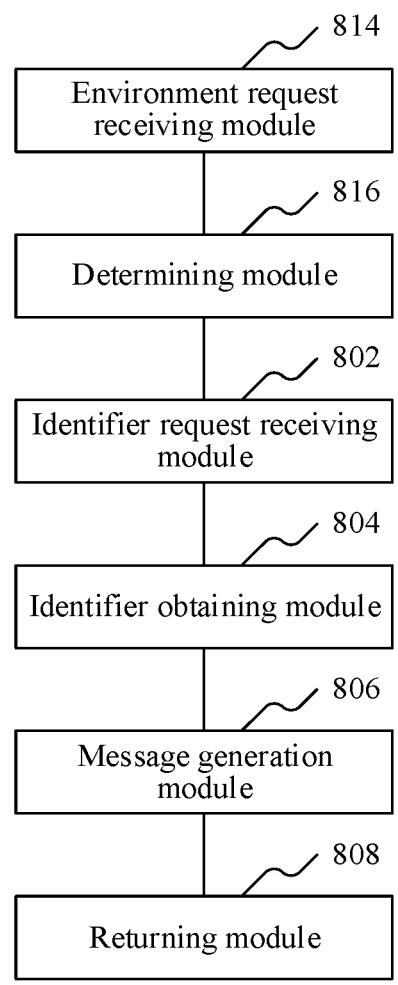
FIG. 12 is a flowchart of a resource transfer apparatus in still yet another embodiment.

As shown in FIG. 12, in an embodiment, before the receiving, through NFC, an AID selection request transmitted by the resource transfer interaction device, the apparatus further includes:

an environment request receiving module 814, configured to receive, through NFC, a resource transfer environment selection request transmitted by the resource transfer interaction device; and a determining module 816, configured to determine a target resource transfer environment according to the resource transfer environment selection request, the identifier obtaining module 804 being further configured to select the target resource transfer AID obtained from a target resource transfer environment directory corresponding to the target resource transfer environment.

Figure 13:
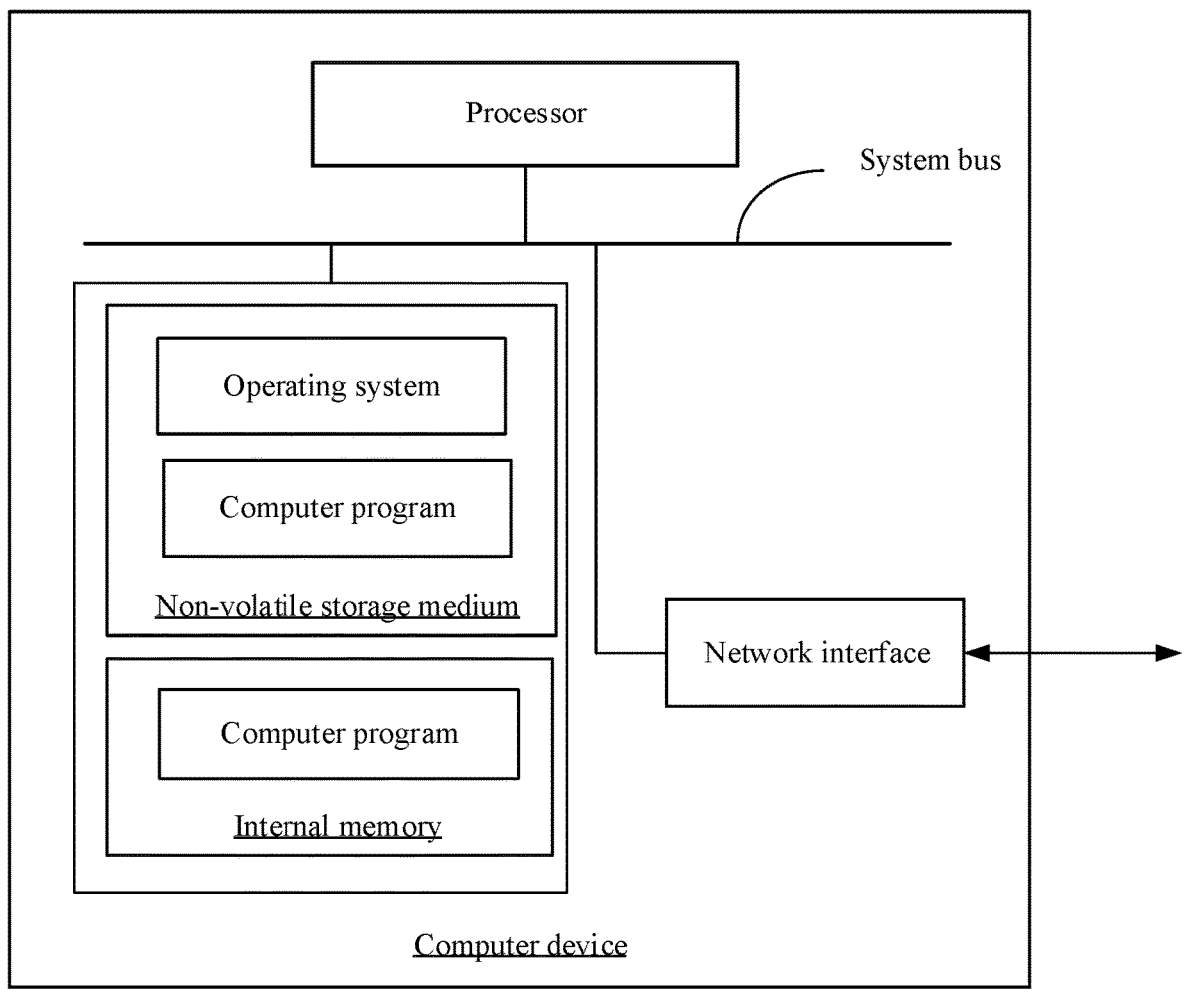
FIG. 13 is a diagram showing an internal structure of a computer device in an embodiment.

FIG. 13 is a diagram showing an internal structure of a computer device in an embodiment. The computer device may be specifically a terminal. As shown in FIG. 13, the computer device includes a processor, a memory, and a network interface that are connected through a system bus. The memory includes a non-volatile storage medium and an internal memory. The non-volatile storage medium of the computer device stores an operating system, and may further store a computer program. The computer program, when executed by the processor, may cause the processor to implement a resource transfer method. The internal memory or may store a computer program, the computer program, when executed by the processor, causing the processor to perform the resource transfer method according to an embodiment of the disclosure. A person skilled in the art may understand that the structure shown in FIG. 13 is only a block diagram of a partial structure related to the solution of the disclosure, and does not limit the computer device to which the solution of the disclosure is applied. Specifically, the computer device may include more or fewer components than those shown in FIG. 13, or some components may be combined, or different component deployment may be used.

In an embodiment, the resource transfer apparatus provided in the disclosure may be implemented in a form of a computer program, and the computer program may be run on the computer device shown in FIG. 13. The memory of the computer device may store program modules forming the resource transfer apparatus, for example, the identifier request receiving module 802, the identifier obtaining module 804, the message generation module 806 and the returning module 808. The computer program formed by the program modules causes the processor to perform the operations of the resource transfer method described in the embodiments of the disclosure in this specification. For example, the computer device shown in FIG. 13 may receive, through NFC, an AID selection request transmitted by the resource transfer interaction device through the identifier request receiving module 802 of the resource transfer apparatus shown in FIG. 8; obtain a target resource transfer AID according to the AID selection request through the identifier obtaining module 804; obtain resource transfer data corresponding to the target resource transfer AID through the message generation module 806, generate a corresponding AID selection response message according to the target resource transfer AID and the resource transfer data, the resource transfer data being located in a custom field of the AID selection response message; and return the AID selection response message to the resource transfer interaction device through the returning module 808, the resource transfer interaction device being configured to complete a corresponding resource transfer according to the target resource transfer AID and the resource transfer data.

In an embodiment, a computer device is provided, including a memory and a processor, the memory storing a computer program, the computer program, when executed by the processor, causing the processor to perform the following operations: receiving, through NFC in a case that the terminal is located within an identification range of a resource transfer interaction device, an AID selection request transmitted by the resource transfer interaction device; obtaining a target resource transfer AID according to the AID selection request; obtaining resource transfer data corresponding to the target resource transfer AID, and generating a corresponding AID selection response message according to the target resource transfer AID and the resource transfer data, the resource transfer data being located in a custom field of the AID selection response message; and returning the AID selection response message to the resource transfer interaction device, the resource transfer interaction device being configured to complete a corresponding resource transfer according to the target resource transfer AID and the resource transfer data.

In an embodiment, the custom field includes a first custom field and a second custom field, and the generating a corresponding AID selection response message according to the target resource transfer AID and the resource transfer data includes: dividing the resource transfer data into first segment data and remaining data in a case that a length of the resource transfer data is greater than a preset length; adding the first segment data to the first custom field; and obtaining a data length corresponding to the remaining data, and adding the data length to the second custom field of the AID selection response message.

In an embodiment, the second custom field further includes: a file identifier used for storing the remaining data in the resource transfer interaction device; and the computer program further causes the processor to perform the following operation: receiving a remaining data reading request transmitted by the resource transfer interaction device, and transmitting the remaining data to the resource transfer interaction device, the resource transfer interaction device being configured to store the received remaining data into a file corresponding to the file identifier.

In an embodiment, the computer program further causes the processor to perform the following operations: receiving resource transfer record data returned by the resource transfer interaction device, the resource transfer record data including at least one of resource transfer location information, a resource transfer value, a device identifier corresponding to the resource transfer interaction device, and resource transfer time information; and storing the resource transfer record data.

In an embodiment, the resource transfer interaction device is a collection device of a public transport vehicle, and the target resource transfer AID is a two-dimensional barcode AID; the resource transfer record data includes travel starting location information, a travel starting collection device identifier, and a travel starting time in a case that the collection device of the public transport vehicle is a travel starting collection device; and the resource transfer record data includes travel ending location information, a travel ending collection device identifier, a travel ending time, and a travel fare in a case that the collection device of the public transport vehicle is a travel ending collection device.

In an embodiment, before the receiving, through NFC, an AID selection request transmitted by the resource transfer interaction device, the computer program further causes the processor to perform the following operation: detecting whether the terminal supports near field communication, and in response to a result being positive (that is, the terminal supports NFC), performing, in a case that the terminal is located within the identification range of the resource transfer interaction device, an operation of receiving, through NFC, the AID selection request transmitted by the resource transfer interaction device. Otherwise, the terminal generates a two-dimensional barcode, the two-dimensional barcode carrying two-dimensional barcode resource transfer data.

In an embodiment, before the receiving, through NFC, an AID selection request transmitted by the resource transfer interaction device, the computer program further causes the processor to perform the following operations: receiving, through NFC, a resource transfer environment selection request transmitted by the resource transfer interaction device; determining a target resource transfer environment according to the resource transfer environment selection request. In an embodiment, the obtaining a target resource transfer AID according to the AID selection request includes: selecting the target resource transfer AID obtained from a target resource transfer environment directory corresponding to the target resource transfer environment.

In an embodiment, a computer-readable storage medium is provided, storing a computer program, the computer program, when executed by a processor, causing the processor to perform the following operations: receiving, through NFC in a case that a terminal is located within an identification range of a resource transfer interaction device, an AID selection request transmitted by the resource transfer interaction device; obtaining a target resource transfer AID according to the AID selection request; obtaining resource transfer data corresponding to the target resource transfer AID, and generating a corresponding AID selection response message according to the target resource transfer AID and the resource transfer data, the resource transfer data being located in a custom field of the AID selection response message; and returning the AID selection response message to the resource transfer interaction device, the resource transfer interaction device being configured to complete a corresponding resource transfer according to the target resource transfer AID and the resource transfer data.

In an embodiment, the custom field includes a first custom field and a second custom field, and the generating a corresponding AID selection response message according to the target resource transfer AID and the resource transfer data includes: dividing the resource transfer data into first segment data and remaining data in a case that a length of the resource transfer data is greater than a preset length; adding the first segment data to the first custom field; and obtaining a data length corresponding to the remaining data, and adding the data length to the second custom field of the AID selection response message.

In an embodiment, the second custom field further includes: a file identifier used for storing the remaining data in the resource transfer interaction device; and the computer program further causes the processor to perform the following operation: receiving a remaining data reading request transmitted by the resource transfer interaction device, and transmitting the remaining data to the resource transfer interaction device, the resource transfer interaction device being configured to store the received remaining data into a file corresponding to the file identifier.

In an embodiment, the computer program further causes the processor to perform the following operations: receiving resource transfer record data returned by the resource transfer interaction device, the resource transfer record data including at least one of resource transfer location information, a resource transfer value, a device identifier corresponding to the resource transfer interaction device, and resource transfer time information; and storing the resource transfer record data.

In an embodiment, the resource transfer interaction device is a collection device of a public transport vehicle, and the target resource transfer AID is a two-dimensional barcode AID; the resource transfer record data includes travel starting location information, a travel starting collection device identifier, and a travel starting time in a case that the collection device of the public transport vehicle is a travel starting collection device; and the resource transfer record data includes travel ending location information, a travel ending collection device identifier, a travel ending time, and a travel fare in a case that the collection device of the public transport vehicle is a travel ending collection device.

In an embodiment, before the receiving, through NFC, an AID selection request transmitted by the resource transfer interaction device, the computer program further causes the processor to perform the following operation: detecting whether the terminal supports near field communication, and in response to a result being positive (that is, the terminal supports NFC), performing, in a case that the terminal is located within the identification range of the resource transfer interaction device, an operation of receiving, through NFC, the AID selection request transmitted by the resource transfer interaction device. Otherwise, the terminal generates a two-dimensional barcode, the two-dimensional barcode carrying two-dimensional barcode resource transfer data.

In an embodiment, before the receiving, through NFC, an AID selection request transmitted by the resource transfer interaction device, the computer program further causes the processor to perform the following operations: receiving, through NFC, a resource transfer environment selection request transmitted by the resource transfer interaction device; determining a target resource transfer environment according to the resource transfer environment selection request; and the obtaining a target resource transfer AID according to the AID selection request includes: selecting the target resource transfer AID obtained from a target resource transfer environment directory corresponding to the target resource transfer environment.

A person of ordinary skill in the art should understand that some or all procedures in the apparatus in the foregoing embodiments may be implemented by a computer program instructing related hardware. The program may be stored in a non-volatile computer-readable storage medium, and when the program is executed, the procedures in the foregoing apparatus embodiments may be implemented. Any reference to a memory, a storage, a database, or another medium used in the various embodiments provided in the disclosure may include a non-volatile and/or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration and not limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM).

The technical features in the foregoing embodiments may be randomly combined. For concise description, not all possible combinations of the technical features in the embodiment are described. However, the combinations of the technical features are all to be considered as falling within the scope described in this specification provided that they do not conflict with each other.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments only show several implementations of the disclosure, and descriptions thereof are in detail, but are not to be understood as a limitation to the patent scope of the disclosure. A person of ordinary skill in the art may further make several variations and improvements without departing from the ideas of the disclosure, and such variations and improvements fall within the protection scope of the disclosure. Therefore, the protection scope of the patent of the disclosure shall be subject to the appended claims.

What is claimed is:

1. A resource transfer method, performed by a terminal, the method comprising:
   receiving, through near field communication (NFC) by a terminal that is located within an identification range of a resource transfer interaction device, an application identifier (AID) selection request from the resource transfer interaction device;
   obtaining a target resource transfer AID based on the AID selection request;
   obtaining resource transfer data corresponding to the target resource transfer AID;
   generating an AID selection response message based on the target resource transfer AID and the resource transfer data, the resource transfer data being located in a custom field of the AID selection response message, wherein the custom field comprises a first custom field and a second custom field, wherein generating the AID selection response message comprises adding the resource transfer data to the AID selection response message; and
   wherein adding the resource transfer data to the AID selection response message includes:
      dividing the resource transfer data into first segment data and remaining data based on a length of the resource transfer data being greater than a preset length;
      adding the first segment data to the first custom field;
      obtaining a data length corresponding to the remaining data; and
      adding the data length to the second custom field; and
   transmitting the AID selection response message to the resource transfer interaction device, a resource transfer being performed based on the target resource transfer AID and the resource transfer data.

2. The method according to claim 1, wherein the second custom field further comprises a file identifier used for storing the remaining data in the resource transfer interaction device, and
   the method further comprising:
   receiving a remaining data reading request from the resource transfer interaction device, and transmitting the remaining data to the resource transfer interaction device.

3. The method according to claim 1, wherein the resource transfer record data comprises at least one of resource transfer location information, a resource transfer value, a device identifier corresponding to the resource transfer interaction device, and resource transfer time information; and
   wherein the method further comprises storing an encrypted resource transfer record data corresponding to the resource transfer record.

4. The method according to claim 3, wherein the target resource transfer AID is a two-dimensional barcode AID, and
   wherein the resource transfer record data comprises at least one of travel starting location information, a travel starting collection device identifier, and a travel starting time.

5. The method according to claim 3, wherein the target resource transfer AID is a two-dimensional barcode AID, and wherein the resource transfer record data comprises at least one of travel ending location information, a travel ending collection device identifier, a travel ending time, and a travel fare.

6. The method according to claim 1, wherein the resource transfer method is performed through a child application program, the child application program being run in a payment environment provided by a parent application program; and wherein the method further includes storing the resource transfer record in a directory corresponding to the child application program.

7. The method according to claim 1, further comprising, prior to the receiving the AID selection request:

receiving, through NFC, a resource transfer environment selection request from the resource transfer interaction device; and determining a target resource transfer environment based on the resource transfer environment selection request, and wherein the obtaining the target resource transfer AID based on the AID selection request comprises selecting the target resource transfer AID obtained from a target resource transfer environment directory corresponding to the target resource transfer environment.

8. A resource transfer apparatus, comprising:

at least one memory configured to store program code; and at least one processor configured to read the program code and operate as instructed by the program code, the program code comprising:

identifier request receiving code configured to cause at least one of the at least one processor to receive, through near field communication (NFC) in a terminal that is located within an identification range of a resource transfer interaction device, an application identifier (AID) selection request from the resource transfer interaction device;

identifier obtaining code configured to cause at least one of the at least one processor to obtain a target resource transfer AID based on the AID selection request;

message generation code configured to cause at least one of the at least one processor to obtain resource transfer data corresponding to the target resource transfer AID, and generate an AID selection response message based on the target resource transfer AID and the resource transfer data, the resource transfer data being located in a custom field of the AID selection response message, wherein the custom field comprises a first custom field and a second custom field wherein the custom field comprises a first custom field and a second custom field, and wherein the message generation code further causes at least one of the at least one processor to add the resource transfer data to the AID selection response message:

wherein adding the resource transfer data to the AID selection response message includes:

dividing the resource transfer data into first segment data and remaining data based on a length of the resource transfer data being greater than a preset length;

adding the first segment data to the first custom field;

obtaining a data length corresponding to the remaining data; and adding the data length to the second custom field; and transmission code configured to cause at least one of the at least one processor to transmit the AID selection response message to the resource transfer interaction device, a resource transfer being performed based on the target resource transfer AID and the resource transfer data.

9. The apparatus according to claim 8, wherein the second custom field further comprises: a file identifier used for storing the remaining data in the resource transfer interaction device, and wherein the program code further comprises:

data transmission code configured to cause at least one of the at least one processor to receive a remaining data reading request from the resource transfer interaction device, and transmit the remaining data to the resource transfer interaction device.

10. The apparatus according to claim 8, wherein the resource transfer record data comprises at least one of resource transfer location information, a resource transfer value, a device identifier corresponding to the resource transfer interaction device, and resource transfer time information; and wherein the program code further comprises:

storage code configured to cause at least one of the at least one processor to store the resource transfer record data.

11. The apparatus according to claim 10, wherein the target resource transfer AID is a two-dimensional barcode AID, and wherein the resource transfer record data comprises at least one of travel starting location information, a travel starting collection device identifier, and a travel starting time.

12. The apparatus according to claim 10, wherein the target resource transfer AID is a two-dimensional barcode AID, and wherein the resource transfer record data comprises at least one of travel ending location information, a travel ending collection device identifier, a travel ending time, and a travel fare.

13. The apparatus according to claim 8, wherein operations of the identifier request receiving code, the identifier obtaining code, the message generation code, and the transmission code are performed through a child application program, the child application program being run in a payment environment provided by a parent application program; and wherein the program code further includes storage code configured to cause at least one of the at least one processor to store the resource transfer record in a directory corresponding to the child application program.

14. The apparatus according to claim 8, wherein the program code further comprises:

receiving code configured to cause at least one of the at least one processor to, receive, through NFC, a resource transfer environment selection request from the resource transfer interaction device; and determining code configured to cause at least one of the at least one processor to determine a target resource transfer environment based on the resource transfer environment selection request, and wherein the identifier obtaining code further causes at least one of the at least one processor to select the target resource transfer AID obtained from a target resource transfer environment directory corresponding to the target resource transfer environment.

15. A non-transitory computer-readable storage medium, storing computer program, the computer program, when executed by at least one processor, causing at least one of the at least one processor to perform:
- receiving, through near field communication (NFC) in a terminal that is located within an identification range of a resource transfer interaction device, an application identifier (AID) selection request from the resource transfer interaction device;
- obtaining a target resource transfer AID based on the AID selection request;
- obtaining resource transfer data corresponding to the target resource transfer AID;
- generating an AID selection response message based on the target resource transfer AID and the resource transfer data, the resource transfer data being located in a custom field of the AID selection response message, wherein the custom field comprises a first custom field and a second custom field, wherein generating the AID selection response message comprises adding the resource transfer data to the AID selection response message; and
  - wherein adding the resource transfer data to the AID selection response message includes:
    - dividing the resource transfer data into first segment data and remaining data based on a length of the resource transfer data being greater than a preset length;
    - adding the first segment data to the first custom field;
    - obtaining a data length corresponding to the remaining data; and
- adding the data length to the second custom field; and
- transmitting the AID selection response message to the resource transfer interaction device, a resource transfer being performed based on the target resource transfer AID and the resource transfer data.

16. A computer device, comprising at least one memory and at least one processor, the at least one memory storing computer program, the computer program, when executed by the at least one processor, causing at least one of the at least one processor to:
- receive, through near field communication (NFC) by a terminal that is located within an identification range of a resource transfer interaction device, an application identifier (AID) selection request from the resource transfer interaction device;
- obtain a target resource transfer AID based on the AID selection request;
- obtain resource transfer data corresponding to the target resource transfer AID;
- generate an AID selection response message based on the target resource transfer AID and the resource transfer data, the resource transfer data being located in a custom field of the AID selection response message, wherein the custom field comprises a first custom field and a second custom field, wherein generating the AID selection response message comprises adding the resource transfer data to the AID selection response message; and
  - wherein adding the resource transfer data to the AID selection response message includes:
    - dividing the resource transfer data into first segment data and remaining data based on a length of the resource transfer data being greater than a preset length;
    - adding the first segment data to the first custom field;
    - obtaining a data length corresponding to the remaining data; and
    - adding the data length to the second custom field; and
- transmit the AID selection response message to the resource transfer interaction device, a resource transfer being performed based on the target resource transfer AID and the resource transfer data.

\* \* \* \* \*